(12) United States Patent
Huang et al.

(10) Patent No.: US 10,960,472 B2
(45) Date of Patent: Mar. 30, 2021

(54) SURFACE TRIMMING PLANE

(71) Applicants: Chien-Hsun Huang, Taichung (TW); Cheng-Xuan Ho, Taichung (TW)

(72) Inventors: Chien-Hsun Huang, Taichung (TW); Cheng-Xuan Ho, Taichung (TW)

(*) Notice: Subject to any disclaimer, the term of this patent is extended or adjusted under 35 U.S.C. 154(b) by 46 days.

(21) Appl. No.: 16/508,357

(22) Filed: Jul. 11, 2019

(65) Prior Publication Data
US 2021/0008753 A1 Jan. 14, 2021

(51) Int. Cl.
*B23D 9/00* (2006.01)
*B27C 5/00* (2006.01)
*B27D 5/00* (2006.01)
*B23D 79/08* (2006.01)

(52) U.S. Cl.
CPC .............. *B23D 9/00* (2013.01); *B23D 79/08* (2013.01); *B27C 5/006* (2013.01); *B27D 5/006* (2013.01)

(58) Field of Classification Search
CPC .......... B23D 9/00; B23D 79/08; B27D 5/006; B27C 1/00; B27G 17/00; B27G 17/02; A47L 13/08; A47L 17/06; B44D 3/164; B08B 1/005
USPC ....... 30/169, 286, 314, 320, 346.55, 346.56, 30/346.57, 478, 481, 487, 489, 353; 144/114.1, 115, 130; 15/236.01, 236.05, 15/236.06, 236.07, 236.08
See application file for complete search history.

(56) References Cited

U.S. PATENT DOCUMENTS

| | | | | |
|---|---|---|---|---|
| 312,229 A * | 2/1885 | Tidgewell | ............... | B27G 17/02 30/489 |
| 661,010 A * | 10/1900 | Converse | ............... | B27G 17/02 30/487 |
| 1,053,356 A * | 2/1913 | Burdick | ................. | B27G 17/02 30/492 |
| 1,157,594 A * | 10/1915 | Selleck | .................. | B27G 17/02 30/489 |
| 2,423,713 A * | 7/1947 | Lavietes | ................ | B27G 17/02 30/489 |
| 2,839,109 A * | 6/1958 | Wilson | ................... | B27G 17/02 30/478 |
| 3,644,993 A * | 2/1972 | Chupp | .................. | B27D 5/006 30/280 |
| 4,542,554 A * | 9/1985 | Wallerstein | ............... | A47L 1/16 15/236.02 |
| 4,574,417 A * | 3/1986 | Magnasco | ............... | A47L 13/08 15/236.05 |

(Continued)

*Primary Examiner* — Jason Daniel Prone
*Assistant Examiner* — Samuel A Davies
(74) *Attorney, Agent, or Firm* — Alan D. Kamrath; Karin L. Williams; Mayer & Williams PC

(57) ABSTRACT

A surface trimming plane includes a holder, a blade, a press plate, a movable nut, and an adjusting screw. The holder is provided with an inner stepped face which is provided with two tracks, a guide channel and a perforation. The movable nut is mounted in the guide channel. The adjusting screw extends through the perforation, and is screwed through the movable nut. The blade is located between the two tracks and is secured on the movable nut. The press plate is mounted on the holder and located above the blade. The press plate presses the blade to locate the blade. When the adjusting screw is rotated, the movable nut is moved in the guide channel, and the blade is moved with the movable nut to adjust a displacement of the blade.

9 Claims, 14 Drawing Sheets

(56) References Cited

U.S. PATENT DOCUMENTS

| | | | | |
|---|---|---|---|---|
| 5,459,928 A | * | 10/1995 | Lynn | A47L 13/022 |
| | | | | 144/115 |
| 6,311,783 B1 | * | 11/2001 | Harpell | A01B 1/08 |
| | | | | 172/371 |
| 6,615,497 B1 | * | 9/2003 | Saunders | B27G 17/02 |
| | | | | 30/487 |
| 2003/0029046 A1 | * | 2/2003 | Belsaas | B23D 79/08 |
| | | | | 30/457 |
| 2004/0068878 A1 | * | 4/2004 | Lin | B27G 17/02 |
| | | | | 30/481 |
| 2008/0052924 A1 | * | 3/2008 | Blum | B27G 17/02 |
| | | | | 30/485 |
| 2008/0271326 A1 | * | 11/2008 | Hu | B27G 13/04 |
| | | | | 30/487 |
| 2015/0026986 A1 | * | 1/2015 | Berglund | B23D 79/08 |
| | | | | 30/172 |

* cited by examiner

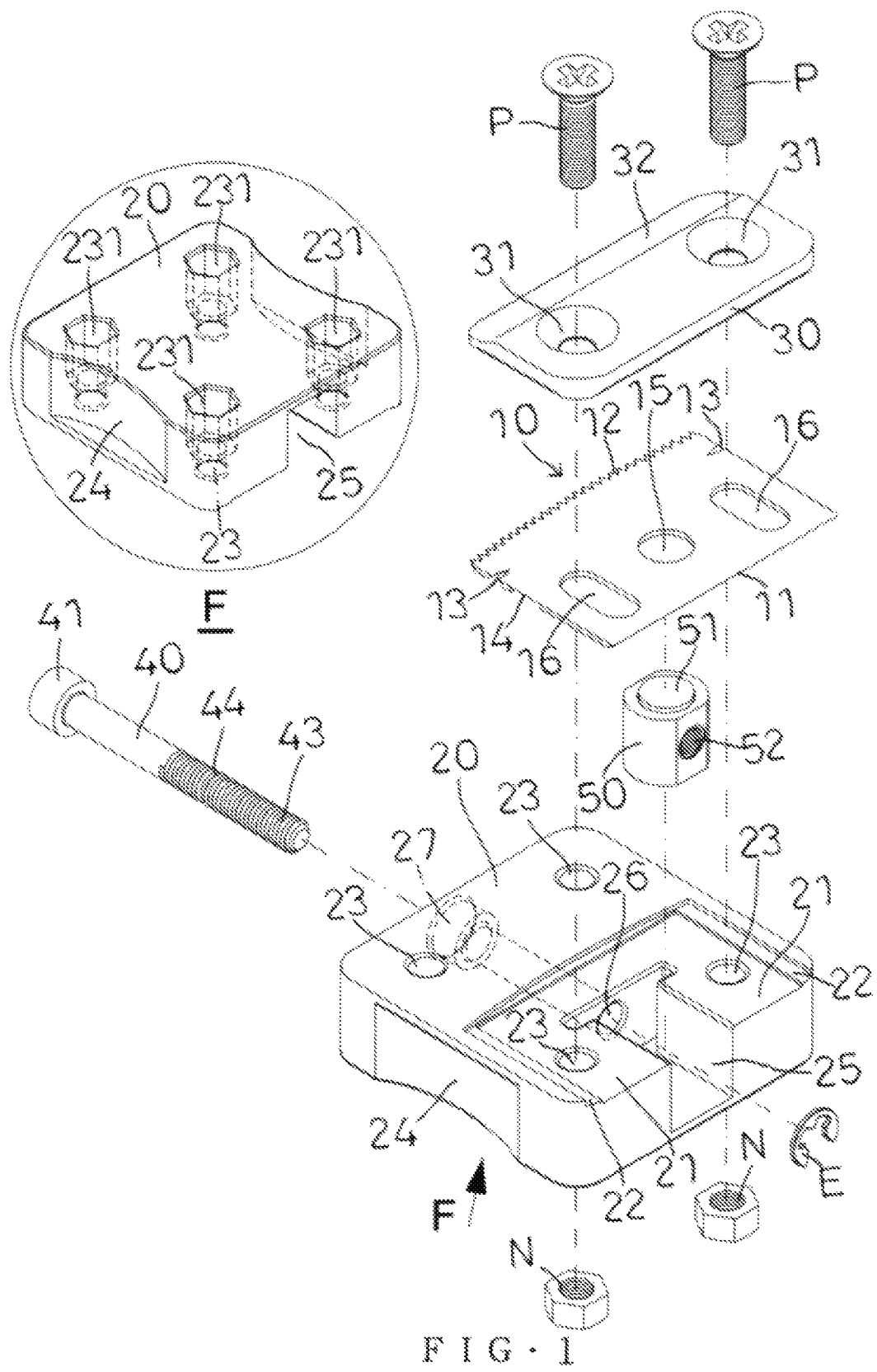
FIG·1

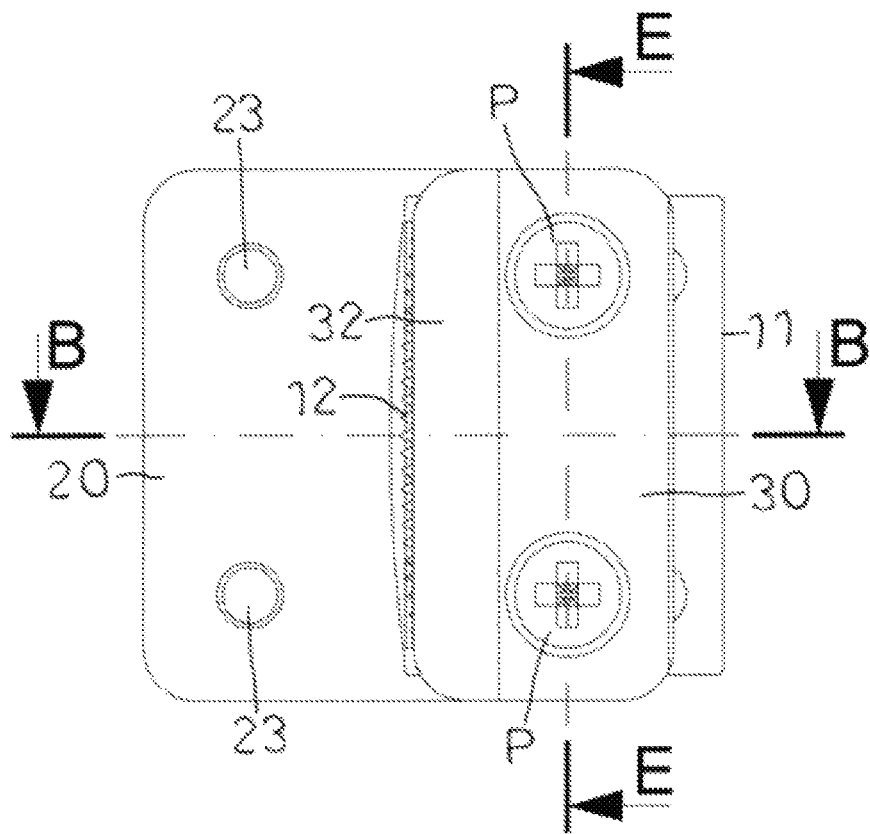
FIG · 2
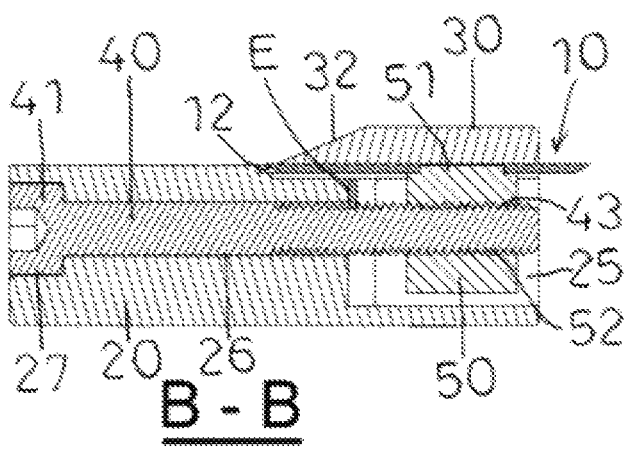
B - B
FIG · 3
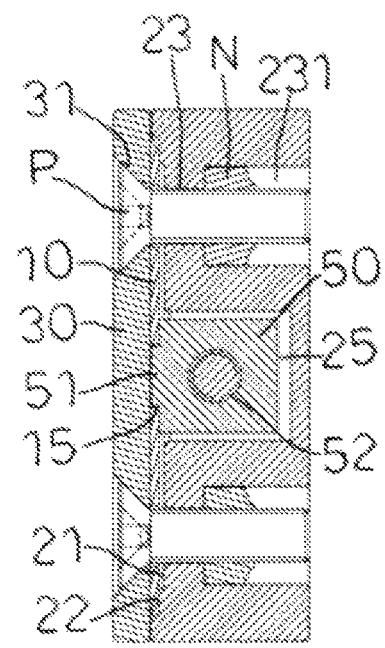
E - E
FIG · 4

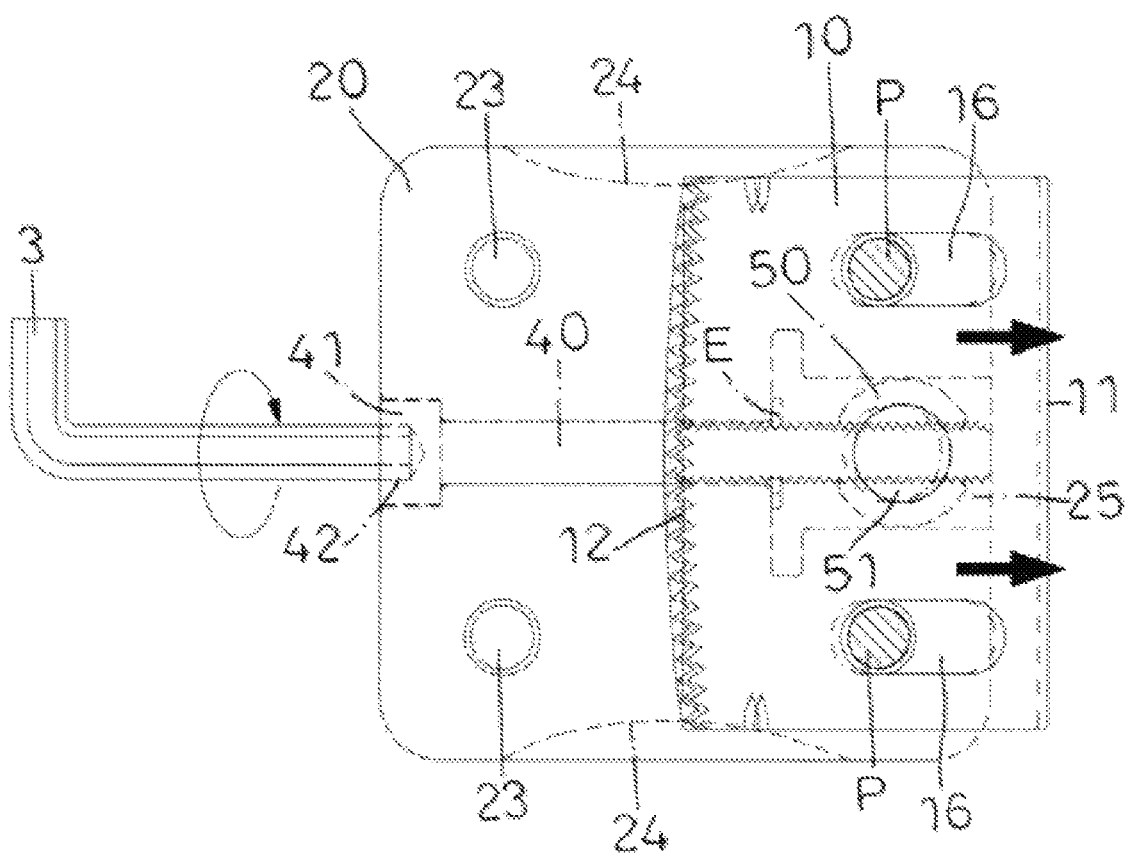
FIG·5

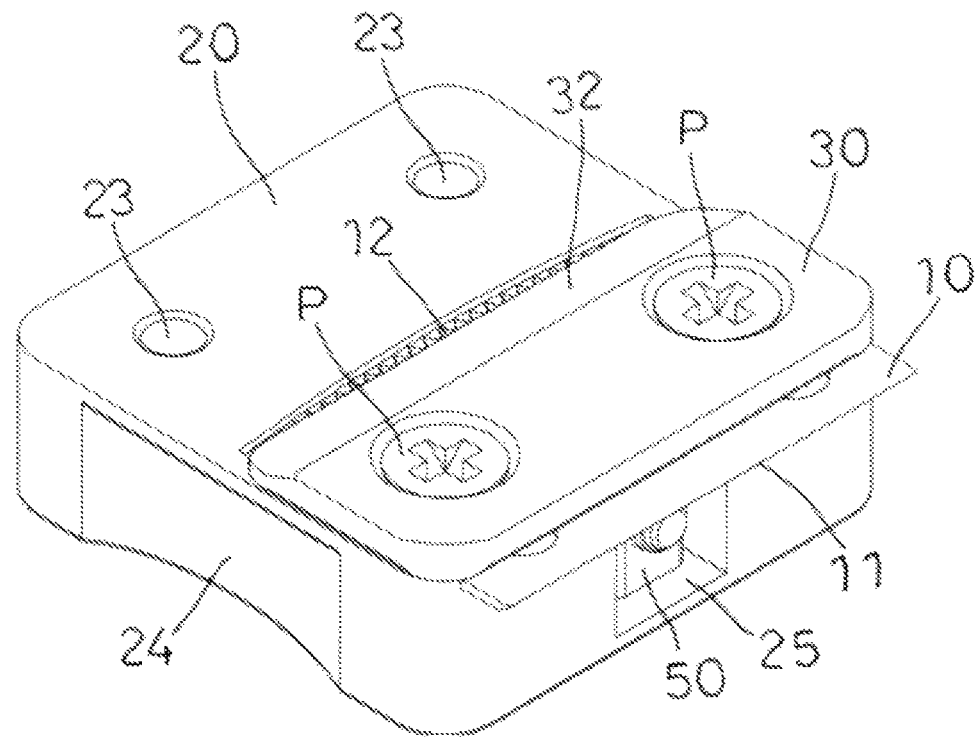
FIG·6

SURFACE TRIMMING PLANE

BACKGROUND OF THE INVENTION

1. Field of the Invention

The present invention relates to a hand tool for a piece of furniture and, more particularly, to a surface trimming plane for trimming the surface of an article, such as a wood board.

2. Description of the Related Art

In decoration of a house, the wood board is used for constructing a piece of furniture. A surface layer or laminate is stuck onto the wood board to protect the inner structure of the wood board, to prevent the wood board from being scratched, and to provide a waterproof function. In addition, the surface layer of the wood board is cleaned easily. However, when the surface layer is stuck onto the wood board, the surface layer easily exceeds the rim of the wood board. Thus, a surface trimming plane is used to trim the surface layer, and to cut the superfluous part of the surface layer. However, the wood board has a periphery with an outer curved angle, an inner curved angle, an oblique angle or the like, such that the cutting blade of the conventional surface trimming plane cannot exactly fit the periphery of the wood board, thereby causing difficulty in cutting the extra portion of the surface layer, and in trimming the surface layer. In addition, the cutting blade of the conventional surface trimming plane does not have a minute adjustment function, such that it is necessary to replace cutting blades of different sizes for different working conditions.

BRIEF SUMMARY OF THE INVENTION

The primary objective of the present invention is to provide a surface trimming plane that is available for different working conditions and purposes.

In accordance with the present invention, there is provided a surface trimming plane comprising a holder, a blade, a press plate, a movable nut, and an adjusting screw. The holder has a front portion provided with an inner stepped face. The inner stepped face of the holder has two tracks provided on two sides thereof. The inner stepped face of the holder is provided with a guide channel. The holder is provided with a perforation connected to the guide channel. The movable nut is mounted in the guide channel of the holder. The adjusting screw extends through the perforation of the holder, and is screwed through the movable nut. The adjusting screw is rotatable in the perforation of the holder. The blade is placed on the holder and located between the two tracks of the holder. The blade is secured on the movable nut to move in concert with the movable nut. The press plate is mounted on the holder and located above the blade. The press plate presses the blade to locate the blade at the front portion of the holder. When the adjusting screw is rotated, the movable nut is moved in the guide channel of the holder by rotation of the adjusting screw, and the blade is moved with the movable nut to adjust a displacement of the blade.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is an exploded perspective view and a locally enlarged view taken along a circle mark "F" of a surface trimming plane in accordance with the preferred embodiment of the present invention.

FIG. 2 is a planar assembly view of the surface trimming plane in accordance with the preferred embodiment of the present invention.

FIG. 3 is a cross-sectional view of the surface trimming plane taken along line B-B as shown in FIG. 2.

FIG. 4 is a cross-sectional view of the surface trimming plane taken along line E-E as shown in FIG. 2.

FIG. 5 is a schematic operational view showing a micro-adjustment of the surface trimming plane.

FIG. 6 is a perspective view of the surface trimming plane in accordance with the first preferred embodiment of the present invention.

DETAILED DESCRIPTION OF THE INVENTION

Figure 7:
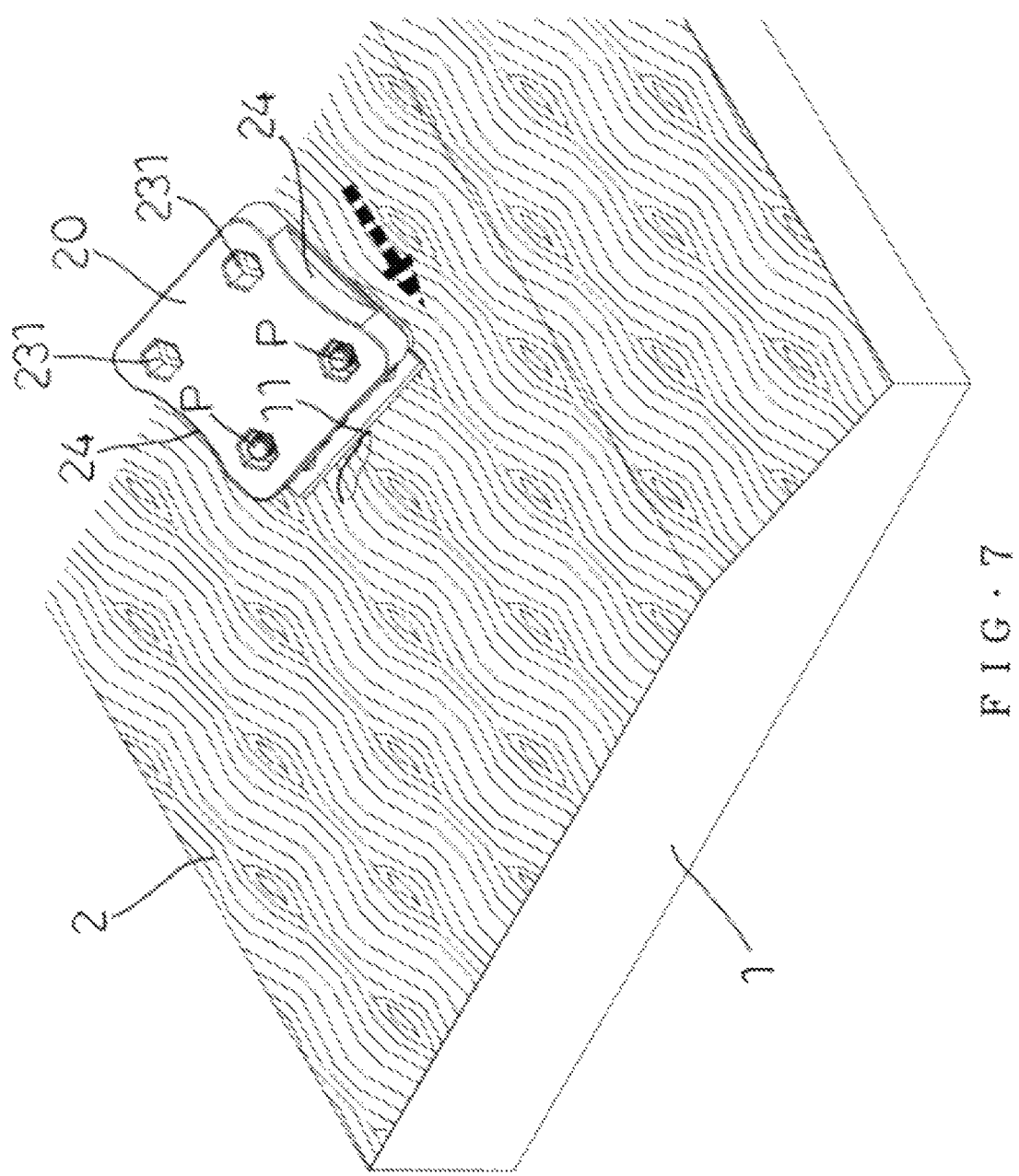
FIG. 7 is a perspective view showing operation of the surface trimming plane as shown in FIG. 6.

Referring to the drawings and initially to FIGS. 1-5, a surface trimming plane (or surface trimmer or laminate trimmer) in accordance with the preferred embodiment of the present invention comprises a holder 20, a blade 10, a press plate 30, a movable nut 50, and an adjusting screw 40.

The holder 20 has a front portion provided with an inner stepped face 21. The inner stepped face 21 of the holder 20 has a straight front portion and an arcuate rear portion. The inner stepped face 21 of the holder 20 has two tracks 22 provided on two sides thereof. The inner stepped face 21 of the holder 20 has a middle provided with a guide channel 25 which is arranged longitudinally. The holder 20 is provided with a perforation 26 connected to the guide channel 25. The perforation 26 of the holder 20 is arranged longitudinally.

The movable nut 50 is mounted in the guide channel 25 of the holder 20 to adjust a displacement of the blade 10.

The adjusting screw 40 extends through the perforation 26 of the holder 20, and is screwed through the movable nut 50. The adjusting screw 40 is rotatable in the perforation 26 of the holder 20.

The blade 10 is placed on the holder 20 and located between the two tracks 22 of the holder 20. The blade 10 is secured on the movable nut 50 to move in concert with the movable nut 50. Preferably, the blade 10 has a rectangular shape.

The press plate 30 is mounted on the holder 20 and located above the blade 10. The press plate 30 presses the blade 10 to locate the blade 10 at the front portion of the holder 20.

In practice, when the adjusting screw 40 is rotated, the movable nut 50 is moved in the guide channel 25 of the holder 20 by rotation of the adjusting screw 40, and the blade 10 is moved with the movable nut 50 as shown in FIG. 5. Thus, the blade 10 has a microadjustment (or fine tuning or minute adjustment) function by rotation of the adjusting screw 40.

In the preferred embodiment of the present invention, the holder 20 is provided with at least one through hole 23, the blade 10 is provided with at least one elongate slot 16, the press plate 30 is provided with at least one through bore 31, and the surface trimming plane further comprises at least one fastening screw "P" extending through the at least one through bore 31 of the press plate 30, the at least one elongate slot 16 of the blade 10, and the at least one through hole 23 of the holder 20, and at least one fastening nut "N" screwed onto the at least one fastening screw "P". The at least one elongate slot 16 of the blade 10 is used for an adjusting purpose.

In the preferred embodiment of the present invention, the blade 10 has a front portion provided with a straight (or linear) scraper 11 for a trimming purpose, and a rear portion provided with a plurality of serrated cutting edges 12. The serrated cutting edges 12 of the blade 10 are arranged in an arcuate shape. The blade 10 is sandwiched between the press plate 30 and the holder 20, with the straight scraper 11 (see FIG. 6) or the serrated cutting edges 12 (see FIG. 8) selectively protruding from the front portion of the holder 20. The blade 10 has two sides each provided with a recessed (or cutout or opened) cutting edge 13. The recessed cutting edge 13 of the blade 10 has a lower part provided with a right-angle cutting edge 14. Preferably, the recessed cutting edge 13 of the blade 10 has a V-shaped configuration, and the right-angle cutting edge 14 of the blade 10 has an L-shaped configuration.

In the preferred embodiment of the present invention, the at least one through bore 31 of the press plate 30 has a fish-eye shape. Preferably, the at least one through bore 31 of the press plate 30 is a counterbore or countersink. Thus, the at least one fastening screw "P" is flat buried into the at least one through bore 31 of the press plate 30.

In the preferred embodiment of the present invention, the at least one through hole 23 of the holder 20 has a bottom provided with a hexagonal recess 231, and the at least one fastening nut "N" is received in the hexagonal recess 231 of the holder 20.

In the preferred embodiment of the present invention, the perforation 26 of the holder 20 has a first end connected to the guide channel 25 and a second end provided with a groove 27. The adjusting screw 40 has a first end provided with a head 41 received in the groove 27 of the holder 20. The head 41 of the adjusting screw 40 is provided with a hexagonal hole 42 (see FIG. 5) for mounting a hex wrench 3 which is used to rotate the adjusting screw 40. The adjusting screw 40 has a second end provided with an external thread 43 extending through the perforation 26 into the guide channel 25 of the holder 20. The movable nut 50 is provided with an internal thread 52 screwed onto the external thread 43 of the adjusting screw 40.

In the preferred embodiment of the present invention, the adjusting screw 40 is provided with an annular groove 44, and a snap ring (or retainer) "E" is mounted in the annular groove 44 of the adjusting screw 40. The snap ring "E" is received in the guide channel 25 and located outside of the perforation 26 of the holder 20. The snap ring "E" rests on a wall of the guide channel 25. Thus, the adjusting screw 40 is restricted between the head 41 of the adjusting screw 40 and the snap ring "E", and is pivotally mounted in the perforation 26 of the holder 20.

In the preferred embodiment of the present invention, the holder 20 has two sides each provided with a concave portion 24 which has an arcuate shape. The concave portion 24 of the holder 20 is used to escape or dodge a workpiece 1 that has an arcuate shape.

In the preferred embodiment of the present invention, the press plate 30 has a side provided with an inclined surface (or ramp or slant) 32. The inclined surface 32 of the press plate 30 is used to escape or dodge a workpiece 1 (see FIG. 14) that has an arcuate shape or has an angle.

In the preferred embodiment of the present invention, the guide channel 25 of the holder 20 has a T-shaped configuration and has a narrower front part and a wider rear part.

In the preferred embodiment of the present invention, the movable nut 50 has a top provided with a positioning portion 51, and the blade 10 has a middle provided with a positioning hole 15 positioned on the positioning portion 51 of the movable nut 50, such that the blade 10 is secured to the movable nut 50.

In the preferred embodiment of the present invention, the holder 20 is provided with a plurality of through holes 23, the blade 10 is provided with two elongate slots 16, the press plate 30 is provided with two through bores 31, and the surface trimming plane comprises two fastening screws "P" and two fastening nuts "N". Preferably, the positioning hole 15 of the blade 10 is located between the two elongate slots 16.

In operation, referring to FIGS. 6 and 7 with reference to FIGS. 1-5, the straight scraper 11 of the blade 10 is selected to protrude from the front portion of the holder 20. Then, the adjusting screw 40 is rotated to move the movable nut 50 and the blade 10 so as to adjust the position of the blade 10. Then, the blade 10 is locked by the press plate 30 and the at least one fastening screw "P". Thus, the surface trimming plane functions as a plane knife. In such a manner, when the blade 10 rests on an outer layer (or a laminate) 2 of a workpiece 1 (such as a wood board), the straight scraper 11 of the blade 10 is moved on the outer layer 2 to press and scrape the bubbles contained in the outer layer 2, such that the outer layer 2 of the workpiece 1 is trimmed and disposed at a flat state.

Figure 8:
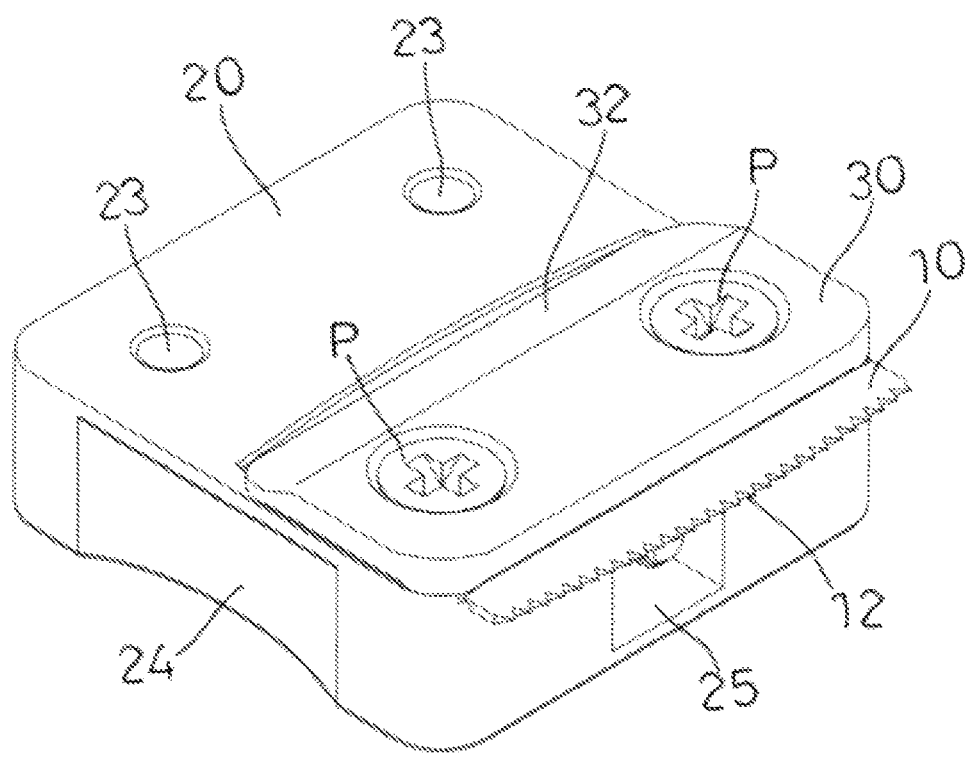
FIG. 8 is a perspective view of the surface trimming plane in accordance with the second preferred embodiment of the present invention.
Figure 9:
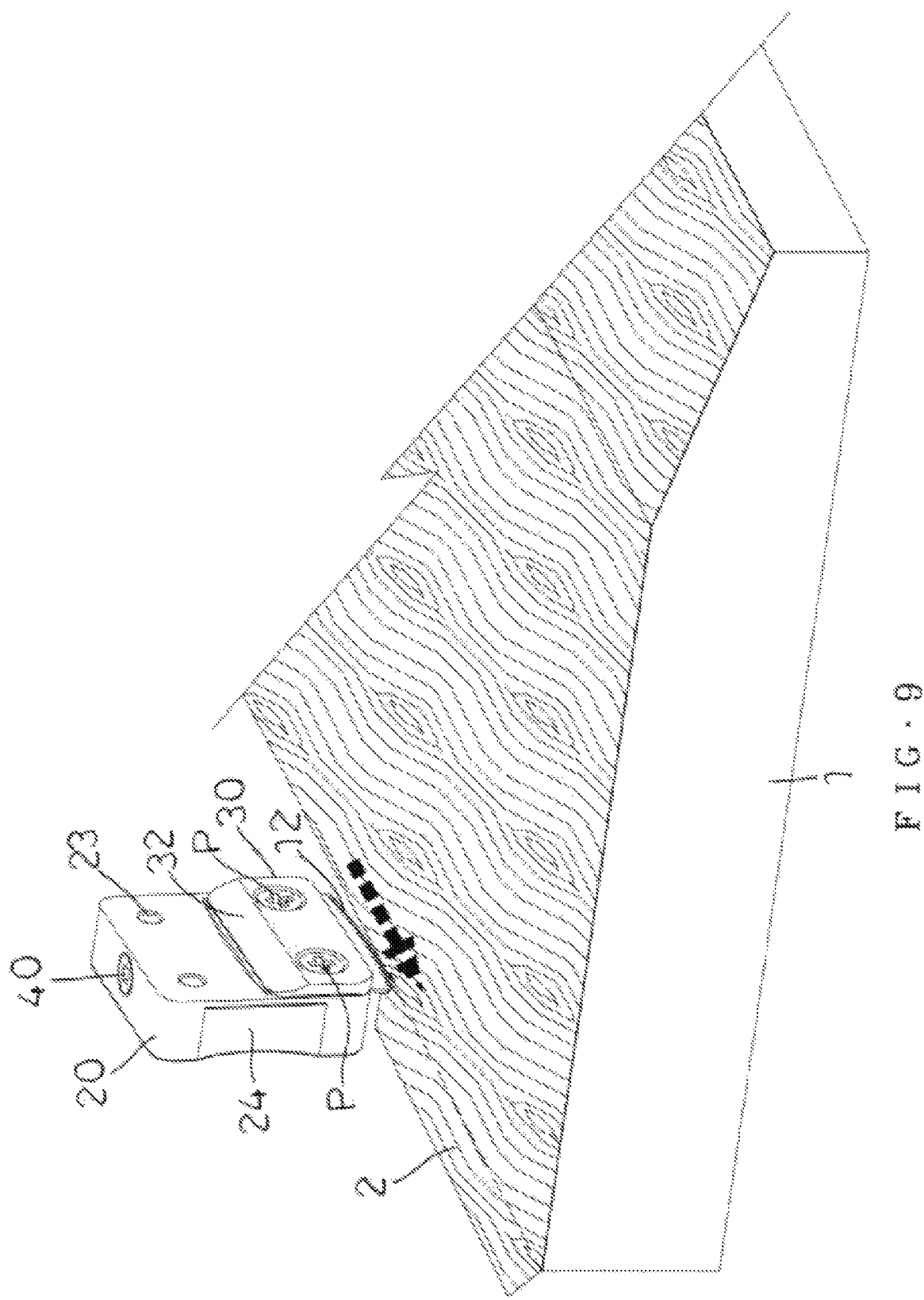
FIG. 9 is a perspective view showing operation of the surface trimming plane as shown in FIG. 8.

Alternatively, referring to FIGS. 8 and 9 with reference to FIGS. 1-5, the serrated cutting edges 12 of the blade 10 are selected to protrude from the front portion of the holder 20. Then, the adjusting screw 40 is rotated to move the movable nut 50 and the blade 10 so as to adjust the position of the blade 10. Then, the blade 10 is locked by the press plate 30 and the at least one fastening screw "P". Thus, the surface trimming plane is operated for cutting at an angle of ninety degrees. In such a manner, the serrated cutting edges 12 of the blade 10 are used to cut a redundant part of the outer layer 2 on the workpiece 1.

Figure 10:
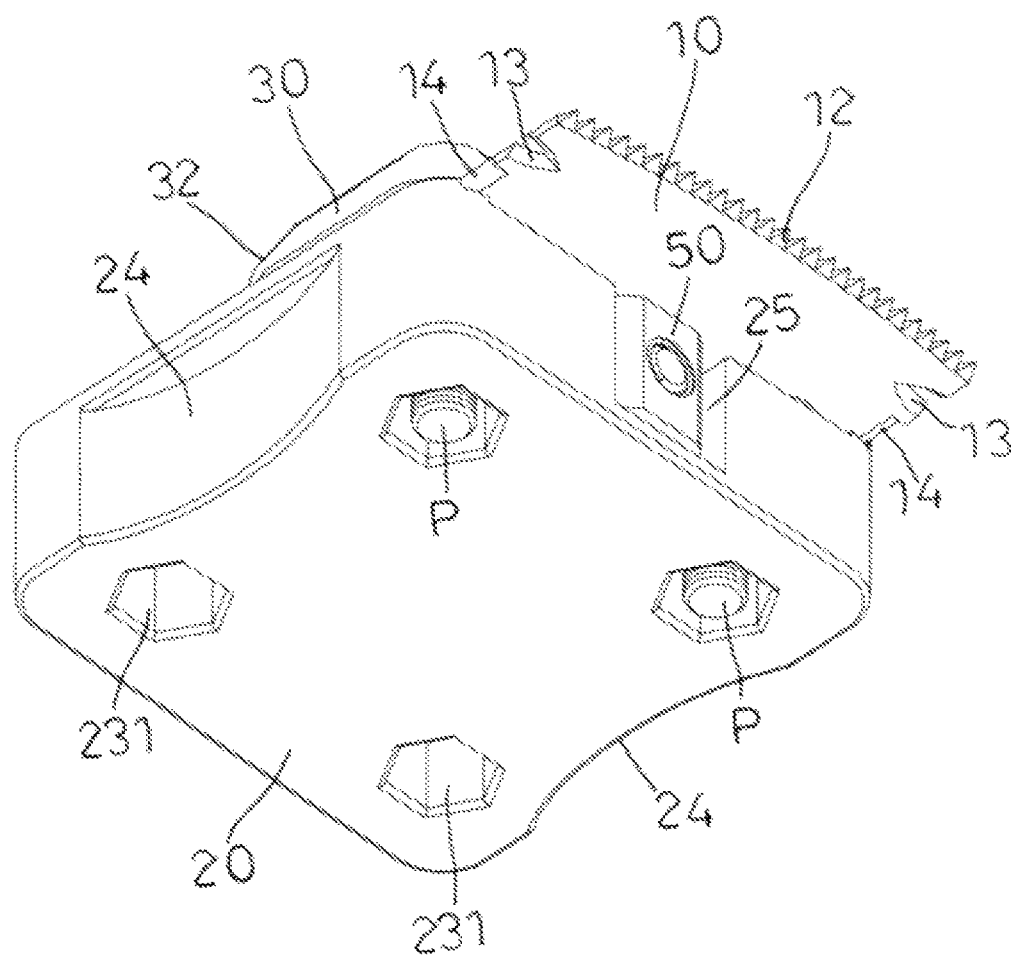
FIG. 10 is a perspective view of the surface trimming plane in accordance with the third preferred embodiment of the present invention.
Figure 11:
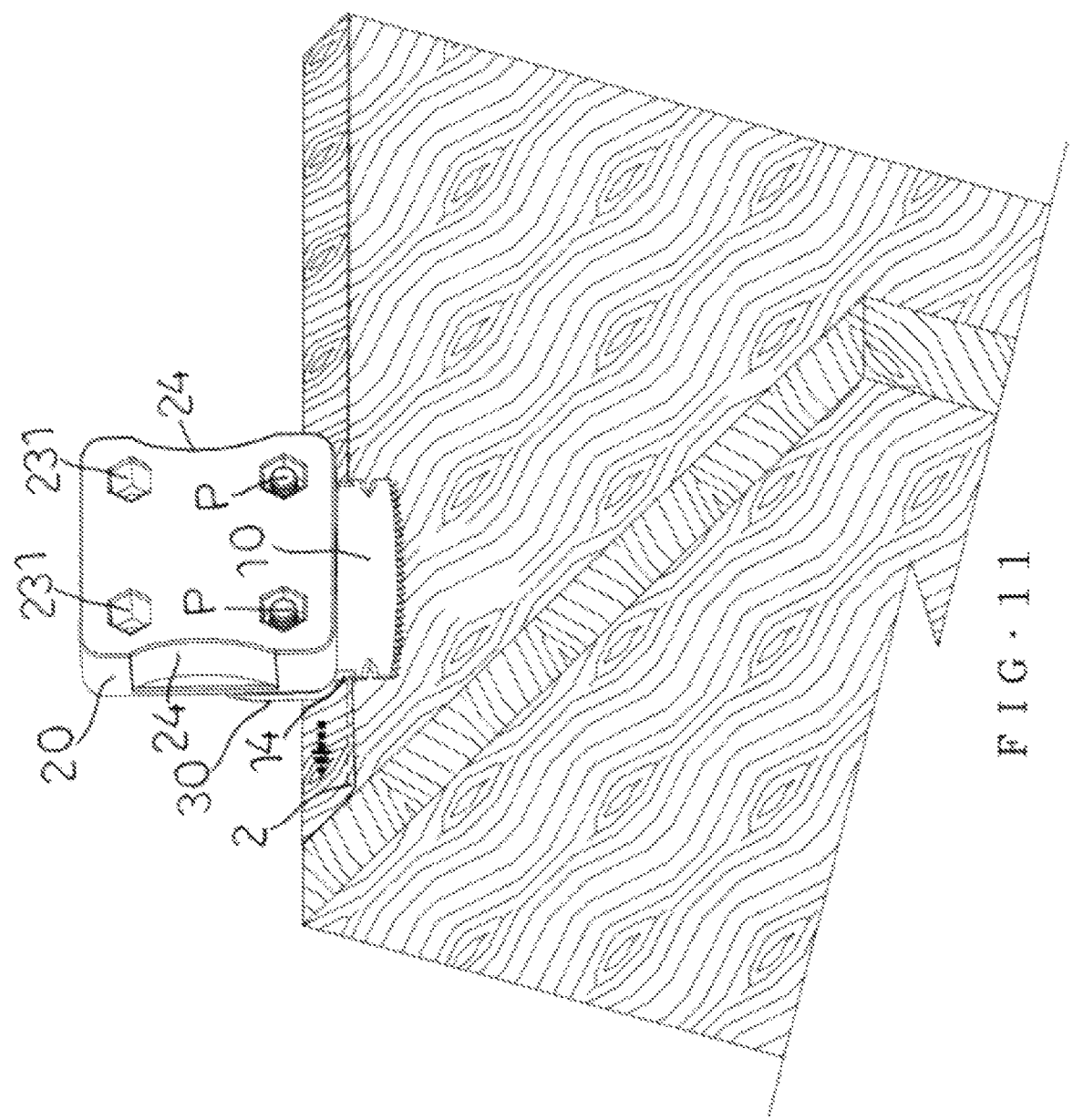
FIG. 11 is a perspective view showing operation of the surface trimming plane as shown in FIG. 10.
Figure 12:
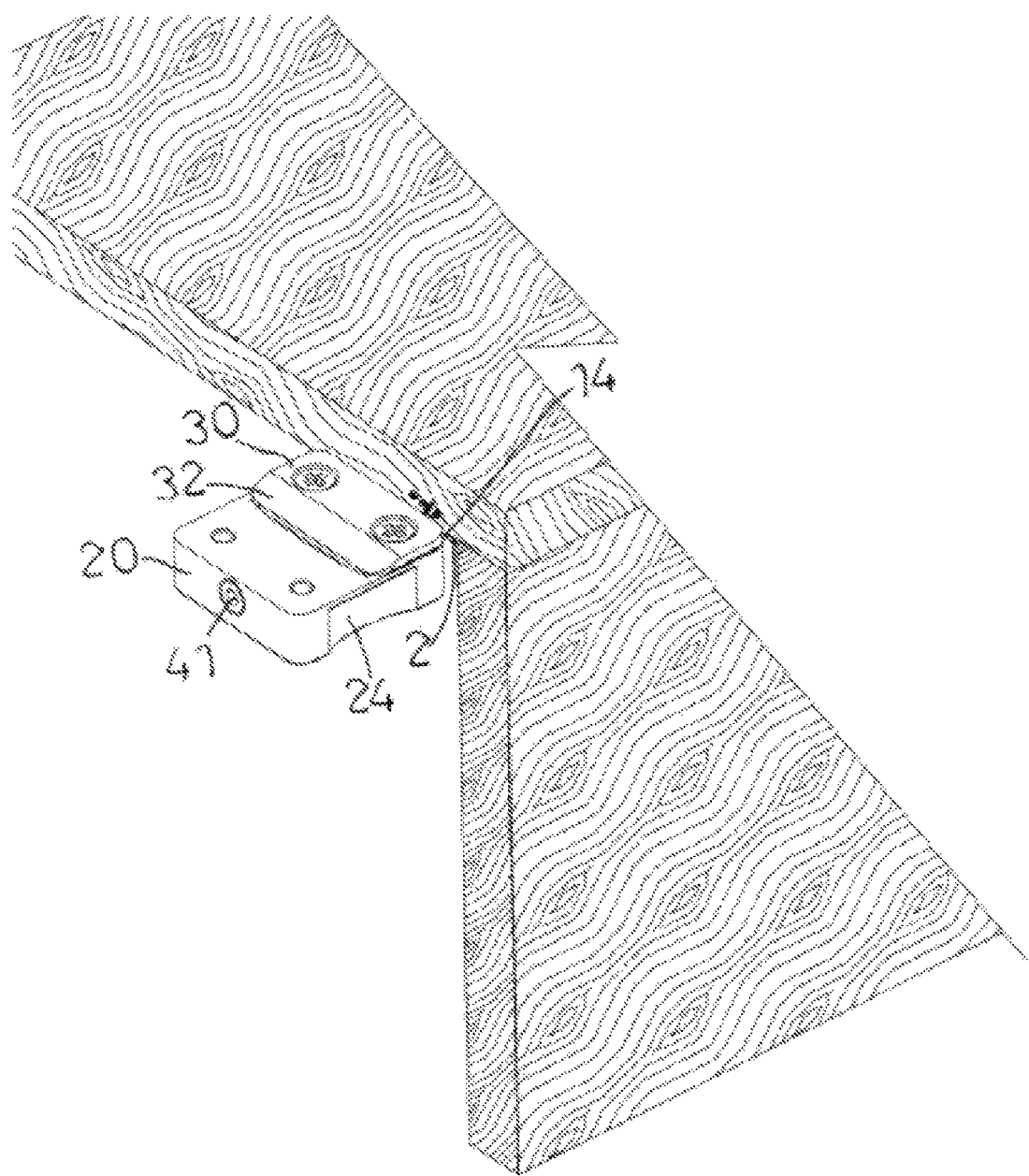
FIG. 12 is another perspective view showing operation of the surface trimming plane as shown in FIG. 10.

Alternatively, referring to FIGS. 10-12 with reference to FIGS. 1-5, the right-angle cutting edge 14 of the blade 10 is selected to protrude from the front portion of the holder 20. Then, the adjusting screw 40 is rotated to move the movable nut 50 and the blade 10 so as to adjust the position of the blade 10. Then, the blade 10 is locked by the press plate 30 and the at least one fastening screw "P". In such a manner, the serrated cutting edges 12 of the blade 10 the right-angle cutting edge 14 of the blade 10 is used to cut a redundant part of the outer layer 2 on an inner periphery of the workpiece 1 at a right angle.

Figure 13:
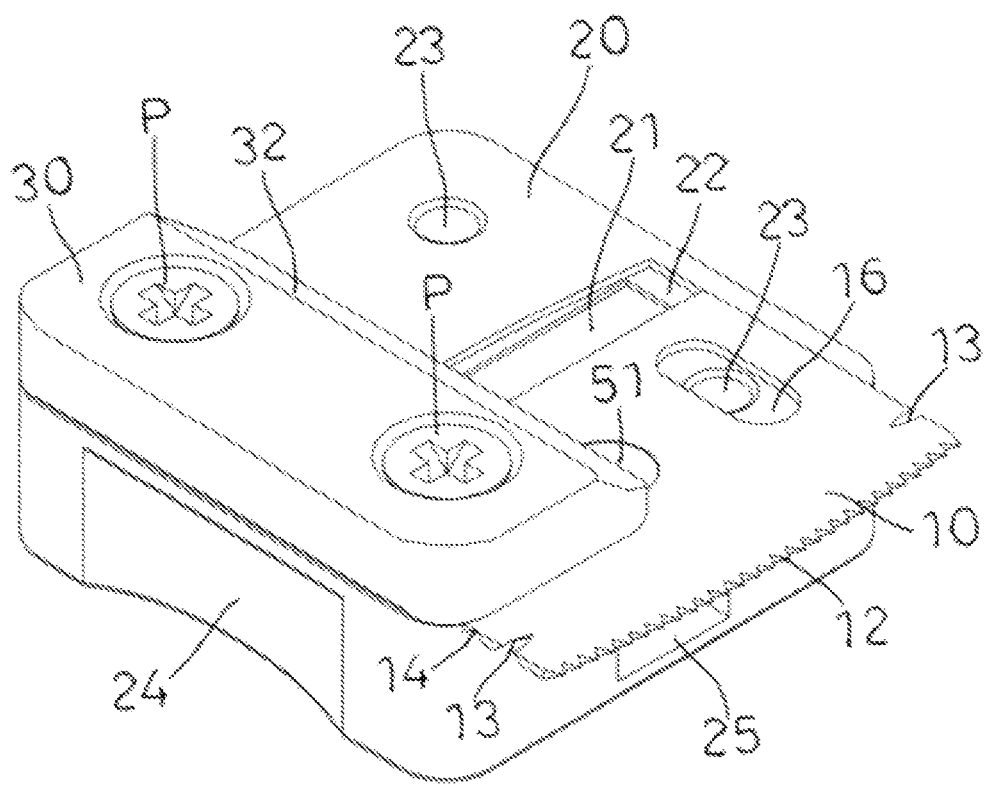
FIG. 13 is a perspective view of the surface trimming plane in accordance with the fourth preferred embodiment of the present invention.
Figure 14:
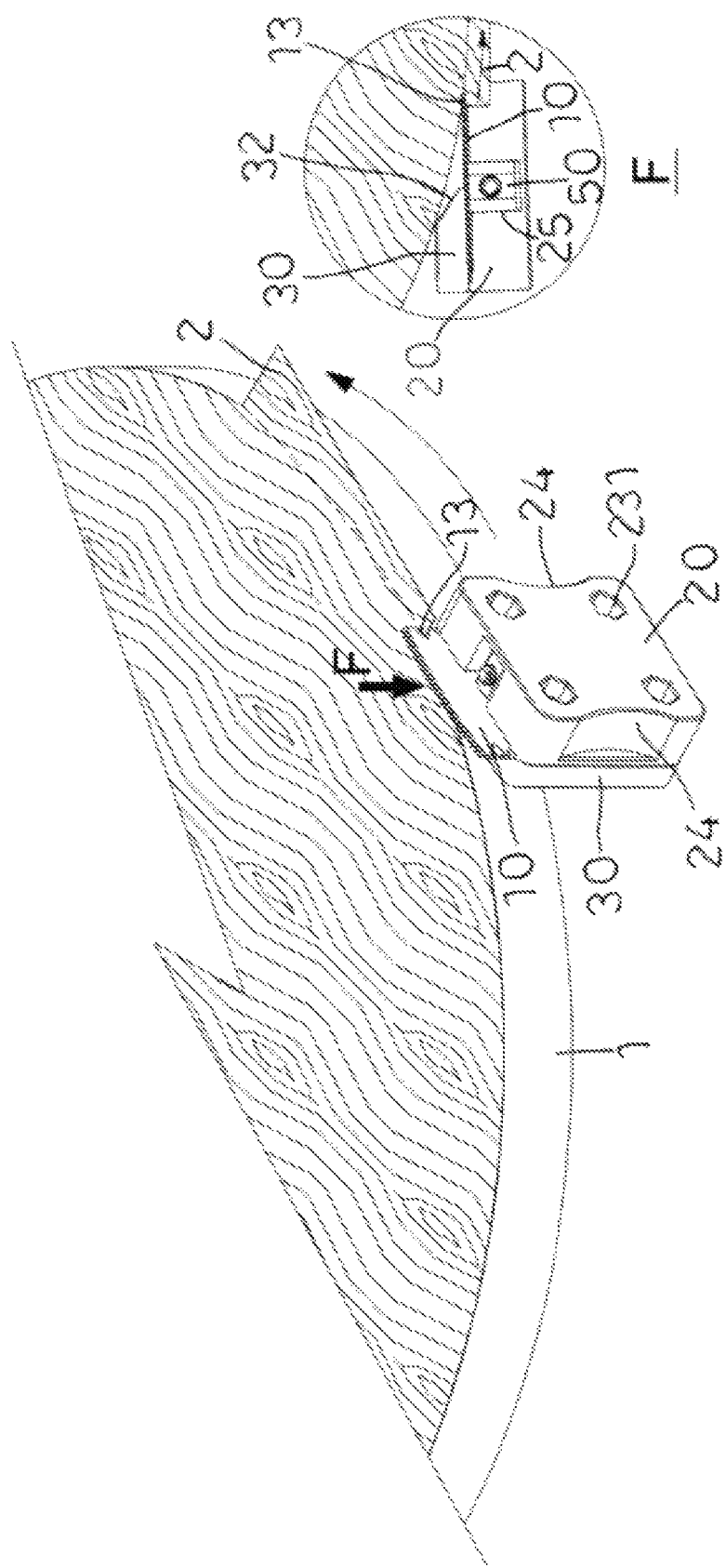
FIG. 14 is a perspective view and a locally enlarged view taken along a circle mark "F" showing operation of the surface trimming plane as shown in FIG. 13.

Alternatively, referring to FIGS. 13 and 14 with reference to FIGS. 1-5, the recessed cutting edge 13 of the blade 10 is selected to protrude from the front portion of the holder 20. Then, the adjusting screw 40 is rotated to move the movable nut 50 and the blade 10 so as to adjust the position of the blade 10. Then, the press plate 30 and the at least one fastening screw "P" are locked on the right side of the holder 20. At this time, the inclined surface 32 of the press plate 30 is directed toward the left side of the holder 20. Thus, the surface trimming plane is operated for cutting the excess part of an arcuate article. In such a manner, the inclined surface 32 of the press plate 30 rests on the circular periphery of the workpiece 1, and the recessed cutting edge 13 of the blade 10 is used to cut a redundant part of the outer layer 2 on the circular periphery of the workpiece 1 at a right angle.

Figure 15:
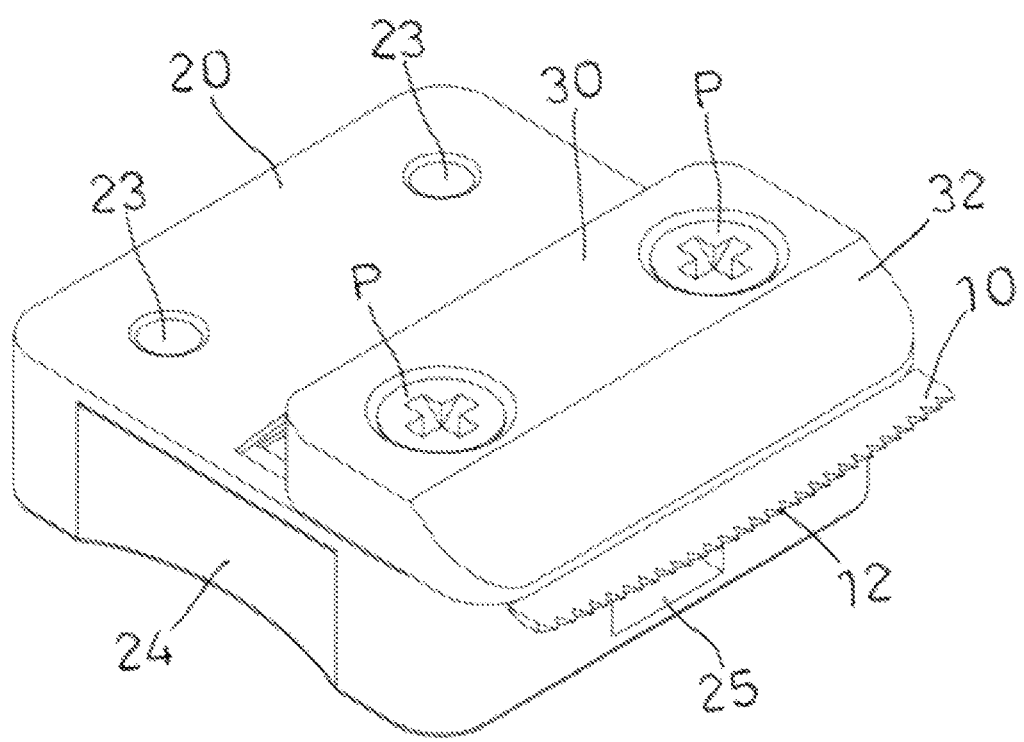
FIG. 15 is a perspective view of the surface trimming plane in accordance with the fifth preferred embodiment of the present invention.
Figure 16:
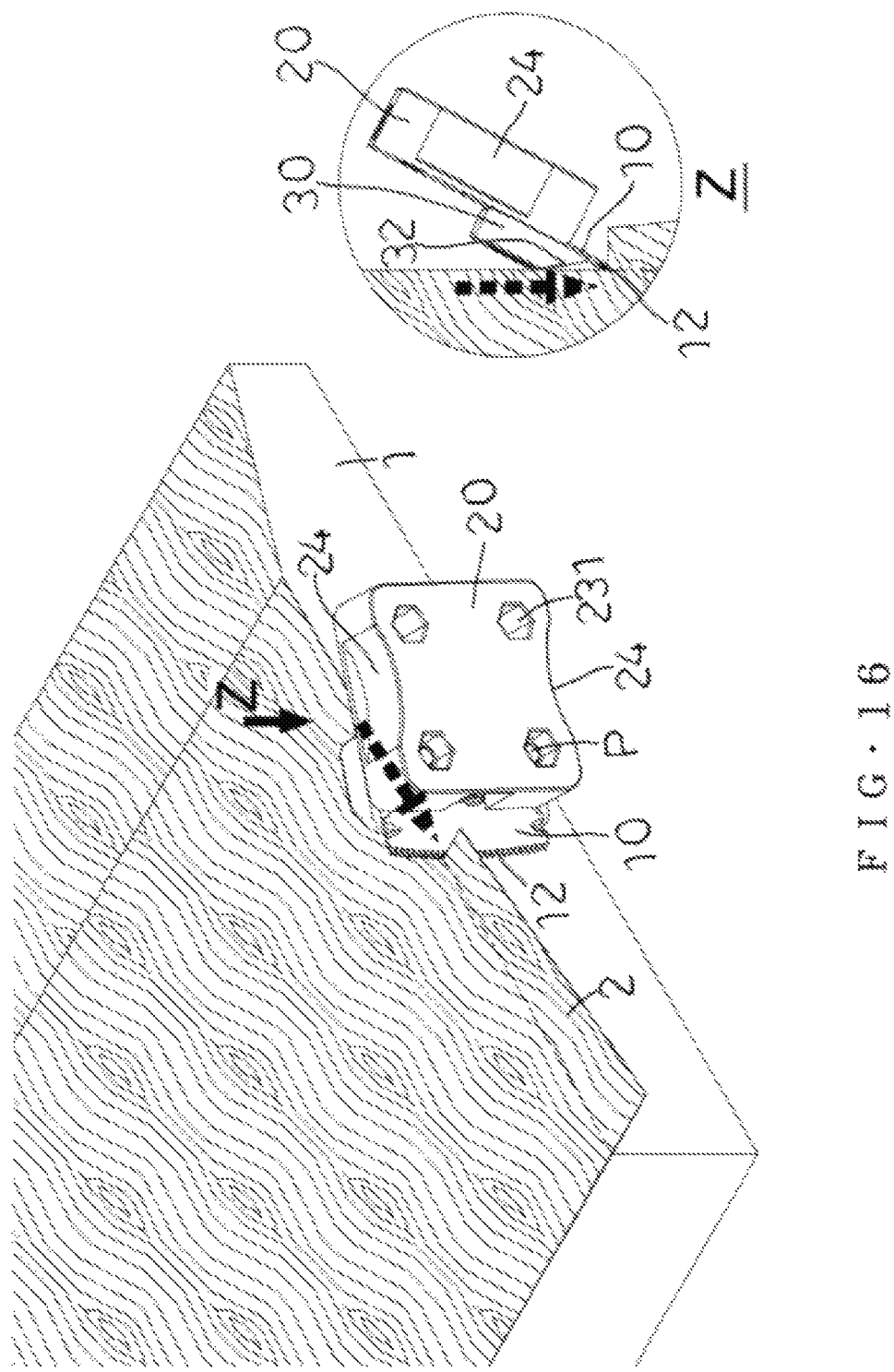
FIG. 16 is a perspective view and a locally enlarged view taken along a circle mark "Z" showing operation of the surface trimming plane as shown in FIG. 15.

Alternatively, referring to FIGS. 15 and 16 with reference to FIGS. 1-5, the serrated cutting edges 12 of the blade 10 are selected to protrude from the front portion of the holder 20. Then, the adjusting screw 40 is rotated to move the movable nut 50 and the blade 10 so as to adjust the position of the blade 10. Then, the press plate 30 and the at least one fastening screw "P" are locked on the front portion of the holder 20, and the blade 10 is locked by the press plate 30 and the at least one fastening screw "P". At this time, the inclined surface 32 of the press plate 30 is directed toward the front portion of the holder 20. Thus, the surface trimming plane is operated to function as a toothed knife. In such a manner, the inclined surface 32 of the press plate 30 rests on a side of the workpiece 1, and the serrated cutting edges 12 of the blade 10 are used to cut a redundant part of the outer layer 2 on the side of the workpiece 1 at a right angle.

Accordingly, the blade 10 is provided with a straight scraper 11, a plurality of serrated cutting edges 12, a recessed cutting edge 13, and a right-angle cutting edge 14, such that the user operates the blade 10 to satisfy different working conditions, and to achieve diverse purposes, without having to replace blades of different sizes, thereby greatly facilitating the user operating the surface trimming plane. In addition, the adjusting screw 40 is rotated to adjust the position of the blade 10, such that the displacement of the blade 10 has a micro-adjustment function by rotation of the adjusting screw 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A surface trimming plane comprising:
a holder, a blade, a press plate, a movable nut, and an adjusting screw;
wherein:
the holder has a front portion provided with an inner stepped face;
the inner stepped face of the holder has two tracks provided on two sides thereof;
the inner stepped face of the holder is provided with a guide channel;
the holder is provided with a perforation connected to the guide channel;
the movable nut is mounted in the guide channel of the holder;
the adjusting screw extends through the perforation of the holder, and is screwed through the movable nut;
the adjusting screw is rotatable in the perforation of the holder;
the blade is placed on the two tracks of the holder;
the blade moves in concert with the movable nut;
the press plate is mounted on the holder;
the press plate presses the blade to locate the blade at the front portion of the holder;
when the adjusting screw is rotated, the movable nut is moved in the guide channel of the holder by rotation of the adjusting screw, and the blade is moved with the movable nut to adjust a displacement of the blade;
the perforation of the holder has a first end connected to the guide channel and a second end provided with a groove;
the adjusting screw has a first end provided with a head received in the groove of the holder;
the head of the adjusting screw is provided with a hexagonal hole for mounting a hex wrench;
the adjusting screw has a second end provided with an external thread extending through the perforation into the guide channel of the holder; and
the movable nut is provided with an internal thread screwed onto the external thread of the adjusting screw.

2. The surface trimming plane of claim 1, wherein the holder is provided with at least one through hole, the blade is provided with at least one elongate slot, the press plate is provided with at least one through bore, and the surface trimming plane further comprises at least one fastening screw extending through the at least one through bore of the press plate, the at least one elongate slot of the blade, and the at least one through hole of the holder, and at least one fastening nut screwed onto the at least one fastening screw.

3. The surface trimming plane of claim 2, wherein the at least one through hole of the holder has a hexagonal recess, and the at least one fastening nut is received in the hexagonal recess of the holder.

4. The surface trimming plane of claim 1, wherein:
the blade has a front portion provided with a straight scraper, and a rear portion provided with a plurality of serrated cutting edges;
the serrated cutting edges of the blade are arranged in an arcuate shape;
the blade has two recessed cutting edges; and
each of the two recessed cutting edges of the blade has a right-angle cutting edge.

5. The surface trimming plane of claim 1, wherein the holder has two sides each provided with a concave portion which has an arcuate shape.

6. The surface trimming plane of claim 1, wherein the press plate has a side provided with an inclined surface.

7. The surface trimming plane of claim 1, wherein the movable nut has a positioning portion, and the blade is provided with a positioning hole positioned on the positioning portion of the movable nut.

8. A surface trimming plane comprising:
a holder, a blade, a press plate, a movable nut, and an adjusting screw;
wherein:
the holder has a front portion provided with an inner stepped face;

the inner stepped face of the holder has two tracks provided on two sides thereof;

the inner stepped face of the holder is provided with a guide channel;

the holder is provided with a perforation connected to the guide channel;

the movable nut is mounted in the guide channel of the holder;

the adjusting screw extends through the perforation of the holder, and is screwed through the movable nut;

the adjusting screw is rotatable in the perforation of the holder;

the blade is placed on the two tracks of the holder;

the blade moves in concert with the movable nut;

the press plate is mounted on the holder;

the press plate presses the blade to locate the blade at the front portion of the holder;

when the adjusting screw is rotated, the movable nut is moved in the guide channel of the holder by rotation of the adjusting screw, and the blade is moved with the movable nut to adjust a displacement of the blade;

the adjusting screw is provided with an annular groove;

a snap ring is mounted in the annular groove of the adjusting screw;

the snap ring is received in the guide channel and located outside of the perforation of the holder; and the adjusting screw is restricted between the head of the adjusting screw and the snap ring, and is rotatably mounted in the perforation of the holder.

9. A surface trimming plane comprising:

a holder, a blade, a press plate, a movable nut, and an adjusting screw;

wherein:

the holder has a front portion provided with an inner stepped face;

the inner stepped face of the holder has two tracks provided on two sides thereof;

the inner stepped face of the holder is provided with a guide channel;

the holder is provided with a perforation connected to the guide channel;

the movable nut is mounted in the guide channel of the holder;

the adjusting screw extends through the perforation of the holder, and is screwed through the movable nut;

the adjusting screw is rotatable in the perforation of the holder;

the blade is placed on the two tracks of the holder;

the blade moves in concert with the movable nut;

the press plate is mounted on the holder;

the press plate presses the blade to locate the blade at the front portion of the holder;

when the adjusting screw is rotated, the movable nut is moved in the guide channel of the holder by rotation of the adjusting screw, and the blade is moved with the movable nut to adjust a displacement of the blade; and the guide channel of the holder has a T-shaped configuration defined by a narrower front part and a wider rear part.

* * * * *